Dec. 29, 1959 B. F. SCHMIDT 2,918,744
FISH HOOK CLAMPING TOOL
Filed July 13, 1953 2 Sheets-Sheet 1
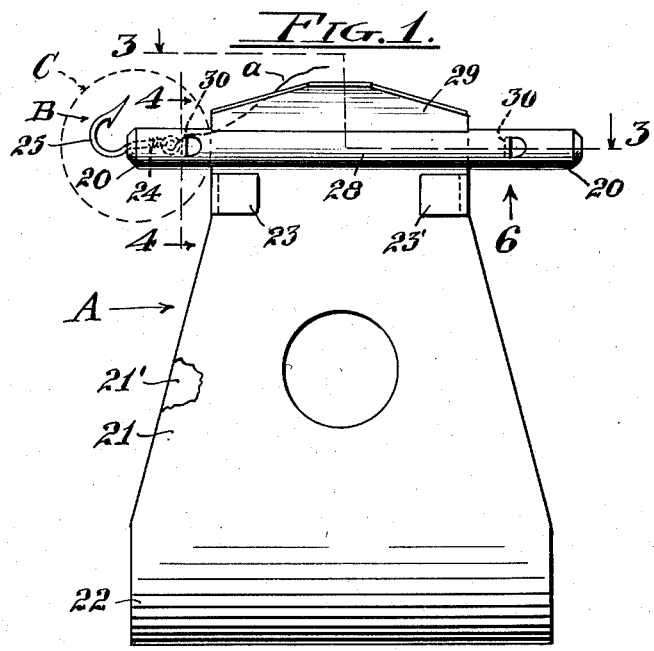
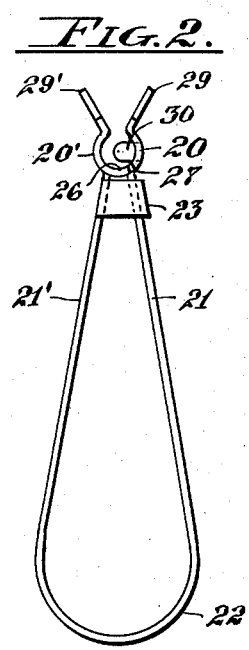
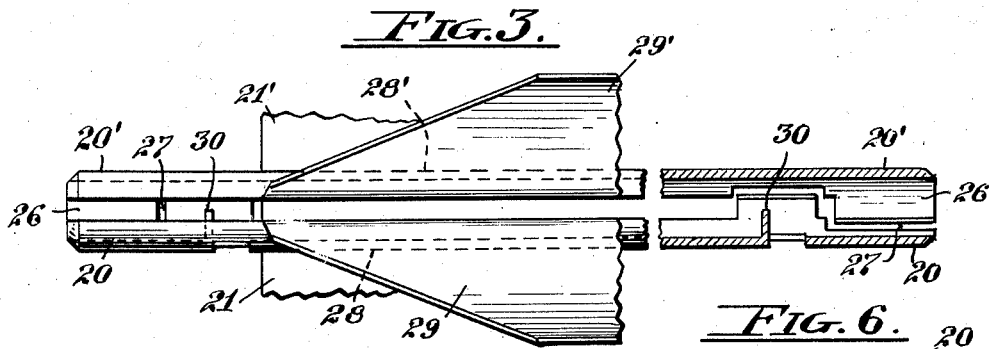
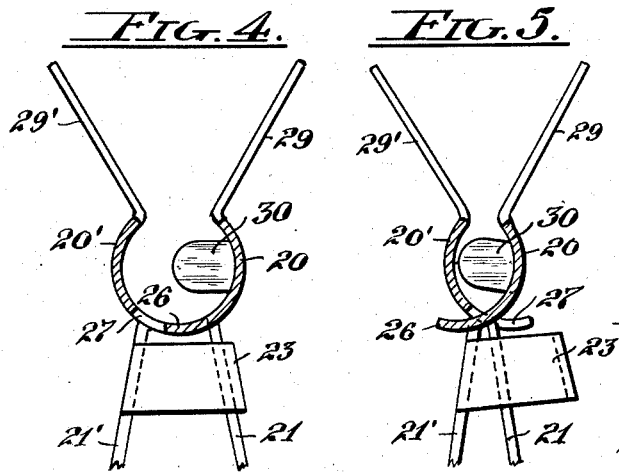
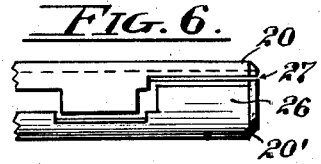
Inventor
Benjamin F. Schmidt
By
R. S. Berry
Attorney Dec. 29, 1959 B. F. SCHMIDT 2,918,744
FISH HOOK CLAMPING TOOL
Filed July 13, 1953 2 Sheets-Sheet 2
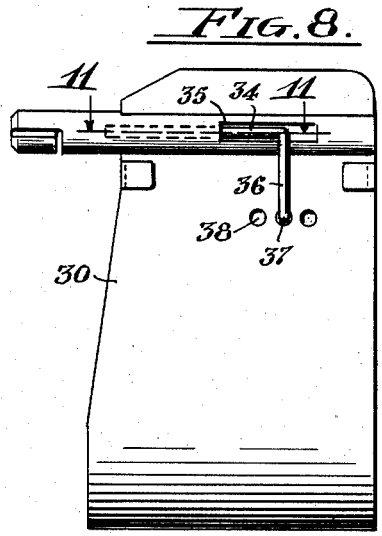
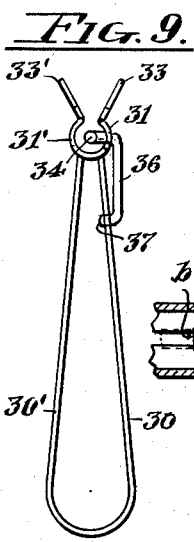
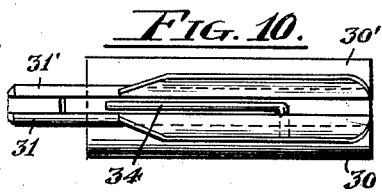
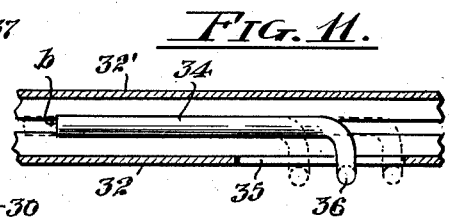
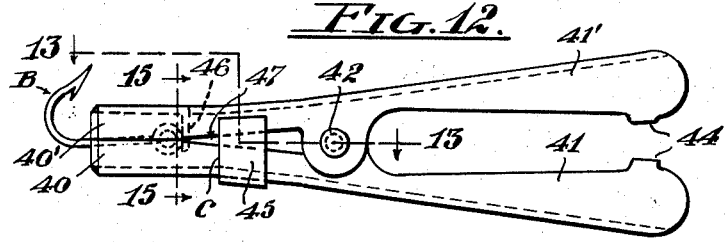
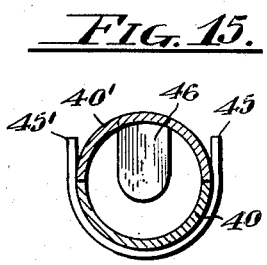
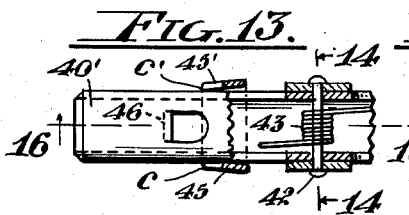
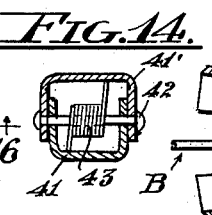
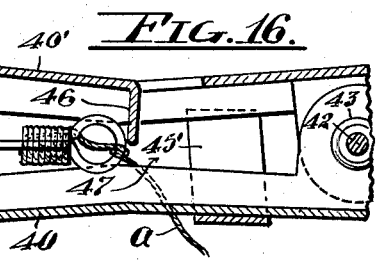
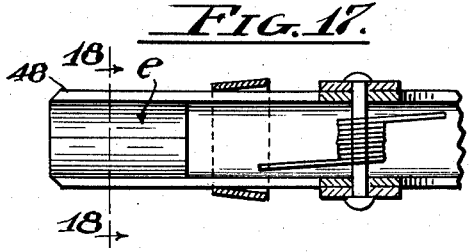
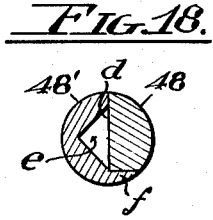
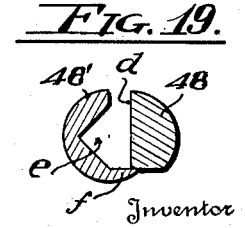
Inventor
Benjamin F. Schmidt
By R. S. Berry
Attorney

United States Patent Office 2,918,744
Patented Dec. 29, 1959

2,918,744

FISH HOOK CLAMPING TOOL

Benjamin F. Schmidt, Los Angeles, Calif.

Application July 13, 1953, Serial No. 367,456

5 Claims. (Cl. 43—4)

This invention relates to a tool for planting fishhooks in bait and has as its primary object the provision of a simple and easily operated device whereby fishhooks may be readily and expeditiously imbedded and completely concealed in salmon eggs, worms and similar penetrable bait and whereby the fishhook may be positioned in its entirety within the bait so that only the leader or snell attached to the eye or shank of the fishhook will protrude from the bait; the device being particularly useful in baiting fishhooks used in angling for fish which are wary of taking the baited hook when any portion of the fishhook is exposed.

Another object is to provide a device of the above character whereby the shank of a fishhook may be firmly held longitudinally thereof and disposed with its hooked end exposed for initial engagement with the bait and whereby the fishhook may be thrust into the bait and deposited therein.

Another object is to provide a fishhook planting tool embodying pincers having a pair of jaws adapted to receive and engage therebetween the shank of a fishhook lengthwise of the latter and in which abutment means are provided for the inner end of the fishhook shank to oppose end thrusts thereon, and to limit the extent of projection of the shank between the jaws as well as the extent of projection of the hooked end of the fishhook from the outer ends of the pincer jaws.

A further object is to provide a fishhook holding pincers embodying a pair of jaws for gripping a fishhook in which the jaws are so formed as to serve as a means for holding the fishhook and planting it completely within the bait with a minimum of laceration of the bait.

With the foregoing objects in view together with such other objects and advantages as may subsequently appear, the invention resides in the parts and in the combination, construction and arrangement of parts hereinafter described and claimed and illustrated by way of example in the accompanying drawing in which:

Fig. 1 is a view of the tool as seen in side elevation and showing a preferred form of the invention;

Fig. 2 is an end view of the tool shown in Fig. 1;

Fig. 3 is an enlarged plan view and horizontal section as seen on the line 3—3 of Fig. 1, with portions broken away;

Fig. 4 is an enlarged sectional view taken on the line 4—4 of Fig. 1 wherein the jaws of the tool are in their open position;

Fig. 5 is a section similar to Fig. 4 showing the jaws in a closed position;

Fig. 6 is an inverted plan view of the jaws as seen in the direction of the arrow 6 in Fig. 1;

Fig. 7 is an enlarged sectional view of a salmon egg showing the manner in which a fishhook may be embedded therein by means of the invention;

Fig. 8 is a view in side elevation of a modified form of the pincer jaws showing the pincers equipped with an adjustable abutment;

Fig. 9 is a front end view of the structure shown in Fig. 8;

Fig. 10 is a plan view of the structure shown in Fig. 8;

Fig. 11 is an enlarged fragmentary detail in horizontal section taken on the line 11—11 of Fig. 8;

Fig. 12 is a view in side elevation showing another form of the invention embodying normally closed jaws;

Fig. 13 is a fragmentary plan view and horizontal section taken on the line 13—13 of Fig. 12;

Fig. 14 is a detail partially in cross section taken on the line 14—14 of Fig. 13;

Fig. 15 is an enlarged cross section taken on the line 15—15 of Fig. 12 as seen in the direction indicated by the arrows with parts removed;

Fig. 16 is a detail in longitudinal section and elevation taken on the line 16—16 of Fig. 13 showing the jaws in an open position;

Fig. 17 is a detail in longitudinal section and elevation showing a modified form of the fishhook engaging jaws shown in Figs. 12 and 13;

Fig. 18 is a detail in cross section taken on the line 18—18 of Fig. 17 showing the jaws in their closed position; and Fig. 19 is a view similar to Fig. 18, showing the jaws in their open position.

Referring to Figs. 1 to 6 of the drawings, A indicates generally a pair of pincers embodying a pair of opposed fishhook engaging jaws 20—20' formed on the outer ends of connected relatively movable arms 21—21' comprising flat metallic plates which extend in divergent relation to each other and are connected at their outer ends in continuation of each other by an arcuate or bowed portion constituting a spring bow 22 which is tensioned to yieldably resist movement of the arms 21—21' and jaws 20—20' toward each other and to move the jaws 20—20' from a closed position away from each other to a normal open position. Outward movement of the arms 21—21' and the jaws 20—20' relative to each other under the urge of the spring bow 22 is limited by means of tabs 23—23' formed on and extending from the side margin of one of the arms 21—21' and returned around the margin of the other arm to form an abutment therefor.

The jaws 20—20', considered collectively, constitute when closed an elongated cylindrical tube of uniform external diameters throughout with the space interiorly thereof open at its ends and forming a channel extending longitudinally of the jaws for the reception in its entirety of the shank and eye, or snell engaging portion, of a fishhook B with the hook portion 25 of the latter protruding from the outer end of the jaws.

In the construction shown in Fig. 1 two pair of the fishhook holding and applying jaws 20—20' are provided, there being a pair of the jaws at each of the opposed side margins of the outer end portions of the arms 21—21'. The jaws on one side margin of the arms are longer than the jaws on the other side margin of the arms to adapt the tool for the reception of shanks of fishhooks of different lengths and to provide the tool with two sets of jaws having different lengths to enable effective penetration of the bait to different depths.

It is desirable that there be no gap between the lower portions of the jaws 20—20' so that the shank 24 of a fishhook may be readily seated between the jaws while in their open or spread apart position and accordingly at least one of the jaws is formed on its lower margin with a tongue 26 arranged to extend across the gap or space normally extending between the adjacent inner margins of the jaws.

As here shown the tongue 26 is formed in continuation of the arcuate side wall of the jaw and projects into a cut away portion 27 of the other jaw thereby forming a fishhook supporting bottom wall interiorly of the jaws. The tongue 26 also serves in conjunction with the tabs 23—23' to prevent the snell or leader a connected to the fishhook from falling below the jaws from therebetween and thereby becoming entangled with the jaws.

The outer end portions of the arms 21—21' are contoured to conform to the arcuate formation of the jaws 20—20', being formed with opposed outwardly extending arcuate wall portions 28—28' leading transversely across the arms 21—21' in continuation of the walls of the jaws 20—20'. Diverging end flanges 29—29' are formed on the outer margins of the wall portions 28—28', which flanges lead from the inner ends of the jaw members throughout the length of such margins. The flanges 29—29' form a guide-way to facilitate positioning the fish line or leader a in longitudinal alignment with the jaws.

It is desirable, but not essential, to provide a stop between the jaws 20—20' to form an abutment for the inner end of a fishhook shank to serve the double purpose of limiting the length of the shank to be encompassed by the jaws in applying the shank thereto and also impose a thrust on the end of the shank when shoving the fishhook into the bait. This stop is shown in Figs. 1, 2, 4 and 5 as comprising a tang 30 struck from the side wall of one of the jaws and extended inwardly therefrom to project into the fishhook receiving channel interiorly of the jaws in inwardly spaced relation to the outer ends thereof.

In the operation of the above described tool, a fishhook B is positioned with its shank 24 disposed throughout its length longitudinally of the channel between the jaws 20—20' with the end of the shank abutting the stop 30 and with the hook 25 protruding from the open end of the jaws with its tip exposed so that it may be directed into the bait C as indicated in Fig. 1, the tool being manipulated to feed the hook into the bait and thereby form an entrant opening therein into which the closed jaws are inserted. The jaws and bait are then advanced relative to each other until the jaws are sufficiently buried to conceal the eye of the hook in the bait that on opening the jaws to release the shank 12 and then withdrawing the jaws, the shank and eye will be completely imbedded and concealed in the bait. The extent of penetration of the bait by the jaws is limited by the portion of the side margins of the arms 21—21' from which the jaws extend, or by the tabs 23—23' which are preferably arranged immediately beneath the base portions of the jaws. On disengaging the jaws from the hook shank and releasing the bait, the latter is pressed by the fingers to close the recess formed by the jaws; the bait being thus brought over the outer end of the shank to seal the latter within the bait and to snugly encompass the leader or snell a as particularly shown in Fig. 7.

In the modified form of the invention shown in Figs. 8 to 11 inclusive, the tool embodies a pair of overlying connected spring arms 30—30' having a pair of fishhook holding and applying jaws 31—31' of arcuate cross section protruding from one side margin of the outer portion thereof substantially corresponding to the previously described construction. The outer end portions of the arms 30 have outwardly extending arcuate portions 32—32' extending transversely thereof in continuation of the inner ends of the jaws 31—31' which portions having diverging flanges 33—33' extending along their outer margins and for the purpose set forth in the structure before described.

The modification here set forth resides in equipping the tool with an adjustable stop which comprises a slide bar 34 arranged in and extending longitudinally of the space formed by the arcuate portions 32—32' of the arms 30—30', the slide bar having an outer end b presented between the jaws to afford the desired abutment. The inner end of the slide bar 34 leads laterally through a longitudinally extending slot 35 formed in the arcuate portion 32 of the arm 30 and connects with a handle portion 36 terminating in an inturned end 37 engageable with any one of a row of holes 38 in the adjacent arm 30 whereby the slide bar 34 may be held against movement in various adjusted positions. By shifting the slide bar 34 its outer end b may be disposed in various positions relative to the outer end of the jaws 31—31'.

In the construction shown in Figs. 12 to 16 inclusive fishhook holding and applying jaws 40—40' are formed on and extend longitudinally from the ends of arms 41—41' pivotally connected by a pivot-pin 42; the arms being pressed by a coil spring 43 carried on the pin 42 and having its ends bearing against the inner faces of the arms 41—41' and exerting a thrust thereon so as to normally spread the arms 41—41' apart and thereby close the jaws 40—40'. The punching jaws 40—40' are insertable lengthwise into the bait to plant a fishhook carried thereby into the bait in a wholly concealed position therein as previously described relative to the form of the invention shown in Fig. 1, the jaws 40—40' being complementary in formation and mode of operation to the jaws 20—20' of Fig. 1.

Formed on the outer end of at least one of the arms 41—41' is a lug 44 arranged to be moved on advancing the arms toward each other into abutting engagement with the other arm or with a corresponding lug thereon so as to limit the extent of inward movement of the arms and thereby limit the extent of opening of the jaws 40—40'.

This limiting of the extent of opening of the jaws 40—40' by the lug 44 is important; the separation of the jaws being only sufficient to permit insertion therebetween of the shank and eye of the fishhook B and just enough to free the shank and eye on opening the jaws whereby excessive mutilation of the bait on withdrawing the jaws therefrom while in their open position will be prevented.

A pair of parallel tongues 45—45' carried on one of the jaws 40—40' span the gap between the jaws in spaced relation to the outer ends or tips of the jaws and also project from the adjacent faces of the jaws to form shoulders c—c'. The tongues 45—45' serve the double purpose of preventing the leader a from becoming entangled between the jaws and as a stop to limit the extent of penetration of the jaws into the bait.

In the opertion of the tool just above described, the jaws 40—40' are swung to an open position on the pivot pin 42 by moving the arms 41—41' toward and against each other at their outer ends, the jaws then extending in open diverging relation to each other. On this being done, a fishhook B with a line a attached is positioned between the jaws with its inner end abutting a stop 46 extending inwardly from one of the jaws as indicated in Fig. 16, the line a being directed laterally through a gap 47 between the jaws so as to extend from the side of the tool in front of the tongues 45—45' which latter serve as guards to prevent entanglement of the line with the pivoted mounting of the jaws. On release of pressure on the arms 41—41' the spring 43 will act thereon to close the jaws 40—40' against the shank of the fishhook thereby gripping the latter so that it may be thrust into the bait as before described.

Figs. 17 to 19 inclusive illustrate a modified construction of the fishhook holding and applying jaws 40—40' in the form of the invention shown in Figs. 12–16 wherein the jaws 40—40' are of arcuate cross section. In this instance a pair of jaw members 48—48' are provided in which the jaw member 48 is formed with a flat inner face d while the jaw member 48' is formed with a longitudinal internal fishhook receiving channel e opposing the face d. A flange f on the lower margin of the jaw member 48' overlies the lower margin of the jaw member 48 to close the gap between the jaw members when in their open position as shown in Fig. 19. The channel e affords a space between the jaws 48—48' for the reception of the shank and eye of a fishhook and to position the shank in longitudinal alignment with the jaws. On thus positioning the shank between the jaws and closing the latter so as to grip the shank the jaws may be operated as before described to thrust the fishhook into the bait.

While specific embodiments of the invention have been shown and described it is not limited to the exact detail of construction set forth, since the invention is subject to and embraces such changes, modifications and equivalents of the parts and their formation and arrangement as come within the purview of the appended claims.

I claim:

1. In a tool for planting fishhooks in bait, a pair of arms, punching jaws on said arms at least one of which is formed with a longitudinal internal channel to receive the shank of a fishhook lengthwise therebetween, said jaws when closed constituting an elongated cylinder of uniform external diameter throughout its length, a tensioned bowed member forming a continuation of said arms normally disposing said jaws in their open position, and abutment means on one of said arms overlying the other arm to limit the extent of opening of said jaws.

2. The structure called for in claim 1 together with a tongue on the underside of at least one of the jaws arranged to span the gap between the jaws when in their open position.

3. In a tool for planting fishhooks in bait, a tensioned bow member terminating in flat plates converging toward each other and having outer ends normally spaced apart by said bow, means on one of said plates forming an abutment for the other of said plates to limit the extent of spacing of said plates, a pair of longitudinally channelled elongated punching jaws on the outer ends of said plates co-operable to receive the shank of a fishhook longitudinally therebetween and to grip said shank on pressing said plates toward each other, said jaws protruding longitudinally from the side margin of the outer end portion of said plates and forming when closed an applicator for insertion of a fishhook endwise in a salmon egg or other bait, and flared guide flanges on the outer ends of said plates for directing the snell of a fishhook in initially positioning the latter between the jaws; said abutment means being located adjacent said jaws to prevent the snell of a fishhook supported between the jaws from dropping through said jaws.

4. In a tool for planting fishhooks in bait, a tensioned bow member terminating in converging flat plates having end portions disposed contiguous each other formed with flared end flanges, a pair of opposed punching jaws on said plates extending laterally from the side margins of the latter adjacent the outer ends thereof and being collectively longitudinally tubular to receive the shank of a fishhook lengthwise therebetween and to grip said shank on pressing said plates toward each other, said jaws when closed forming an applicator for insertion of a fishhook endwise in a salmon egg or other bait.

5. In a tool for planting fishhooks in bait, a tensioned bow member terminating in flat plates having spaced apart but contiguous end portions having flared end flanges, a pair of opposed jaws on said plates extending laterally from the side margins of the latter adjacent the outer ends thereof, said jaws adapted to form collectively a cylinder of uniform diameter throughout the length thereof and being tubular to receive lengthwise therebetween the shank of a fishhook in its entirety, said jaws being operable to hold said shank on pressing said plates toward each other, said jaws when closed forming a cylindrical tube for imbedding the shank of a fishhook in bait.

References Cited in the file of this patent

UNITED STATES PATENTS

| 2,191 | Pitney | July 23, 1841 |
| 168,332 | Hill | Oct. 5, 1875 |
| 460,018 | Kolstad | Sept. 22, 1891 |
| 1,017,093 | Gilmer | Feb. 13, 1912 |
| 1,454,778 | Wegner | May 8, 1923 |
| 2,502,816 | Bennek | Apr. 4, 1950 |
| 2,531,522 | Malouf | Nov. 28, 1950 |
| 2,518,590 | Andrist | Aug. 15, 1950 |
| 2,603,027 | Barber | July 15, 1952 |
| 2,634,159 | Agneberg | Apr. 7, 1953 |
| 2,669,896 | Clough | Feb. 23, 1954 |

FOREIGN PATENTS

| 215,945 | Germany | Nov. 5, 1909 |